United States Patent
Maiman et al.

(10) Patent No.: US 12,253,660 B2
(45) Date of Patent: Mar. 18, 2025

(54) TRANSACTION CARD INCLUDING INFINITY MIRROR

(71) Applicant: Capital One Services, LLC, McLean, VA (US)

(72) Inventors: Tyler Maiman, Melville, NY (US); Bryant Yee, Washington, DC (US); Jude Pierre Anasta, Hudson, NY (US)

(73) Assignee: Capital One Services, LLC, McLean, VA (US)

( * ) Notice: Subject to any disclaimer, the term of this patent is extended or adjusted under 35 U.S.C. 154(b) by 675 days.

(21) Appl. No.: 17/470,367

(22) Filed: Sep. 9, 2021

(65) Prior Publication Data

US 2023/0071203 A1    Mar. 9, 2023

(51) Int. Cl.
| | | |
|---|---|---|
| G02B 17/00 | (2006.01) | |
| B44F 1/04 | (2006.01) | |
| G02B 5/08 | (2006.01) | |
| G06K 19/07 | (2006.01) | |
| G06K 19/077 | (2006.01) | |

(52) U.S. Cl.
CPC ............ *G02B 17/004* (2013.01); *B44F 1/045* (2013.01); *G02B 5/0808* (2013.01); *G06K 19/0723* (2013.01); *G06K 19/07716* (2013.01); *G06K 19/07722* (2013.01)

(58) Field of Classification Search
CPC ................ G02B 17/004; G02B 5/0808; G02B 19/0066; G06K 19/0723; G06K 19/07716; G06K 19/07722; G06K 2019/0629; B44F 1/045; B42D 15/022; B42D 25/36; B42D 25/378; B42D 25/305
See application file for complete search history.

(56) References Cited

U.S. PATENT DOCUMENTS

| | | | | |
|---|---|---|---|---|
| 10,479,128 B2* | 11/2019 | Erickson | ................ | B42D 25/46 |
| 11,847,248 B2* | 12/2023 | Vaughan | ................. | G06F 21/35 |
| 2004/0229022 A1* | 11/2004 | Bourdelais | ............ | B42D 25/00 |
| | | | | 428/195.1 |
| 2005/0040242 A1* | 2/2005 | Beenau | ..................... | G07C 9/28 |
| | | | | 235/487 |
| 2006/0196948 A1* | 9/2006 | Weber | .................... | B42D 25/00 |
| | | | | 235/487 |
| 2007/0298271 A1* | 12/2007 | Liu | ...................... | B42D 25/445 |
| | | | | 428/480 |
| 2009/0206164 A1* | 8/2009 | Kluge | .................... | G06K 19/07 |
| | | | | 235/487 |

* cited by examiner

*Primary Examiner* — Mustak Choudhury
(74) *Attorney, Agent, or Firm* — KDW Firm PLLC

(57) ABSTRACT

Provided are transaction cards including an infinity mirror. In some approaches, a transaction card may include a body comprising a first reflective layer and a second reflective layer, and a light source between the first reflective layer and the second reflective layer.

20 Claims, 3 Drawing Sheets

TRANSACTION CARD INCLUDING INFINITY MIRROR

FIELD

Embodiments of the present disclosure relate to transaction cards and, more particularly, to transaction cards with an infinity mirror.

BACKGROUND

Transaction cards, such as credit and debit cards, are one of the primary means for individuals to complete transactions involving data exchange. Many other forms of cards are also widely used, such as identification cards, loyalty cards, prescription cards, insurance cards, etc. With the increasing use of transaction cards by individuals, the market for different types of transaction cards continues to grow. Card issuers may wish to provide a premium physical card to differentiate such cards from traditional transaction cards. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first reflective layer and a second reflective layer, and a light source between the first reflective layer and the second reflective layer.

In another approach according to the disclosure, a transaction card, may include a body having a first reflective layer and a second reflective layer, and a light source between the first reflective layer and the second reflective layer, wherein the light source extends around a perimeter of the body.

In yet another approach according to the disclosure, a transaction card, may include a body having a first reflective layer and a second reflective layer, wherein an identification chip is coupled to the first reflective layer. The transaction card may further include a light source between the first reflective layer and the second reflective layer, wherein the light source extends around a perimeter of the body.

BRIEF DESCRIPTION OF THE DRAWINGS

The accompanying drawings illustrate example approaches of the disclosure, including the practical application of the principles thereof, as follows.

Figure 1:
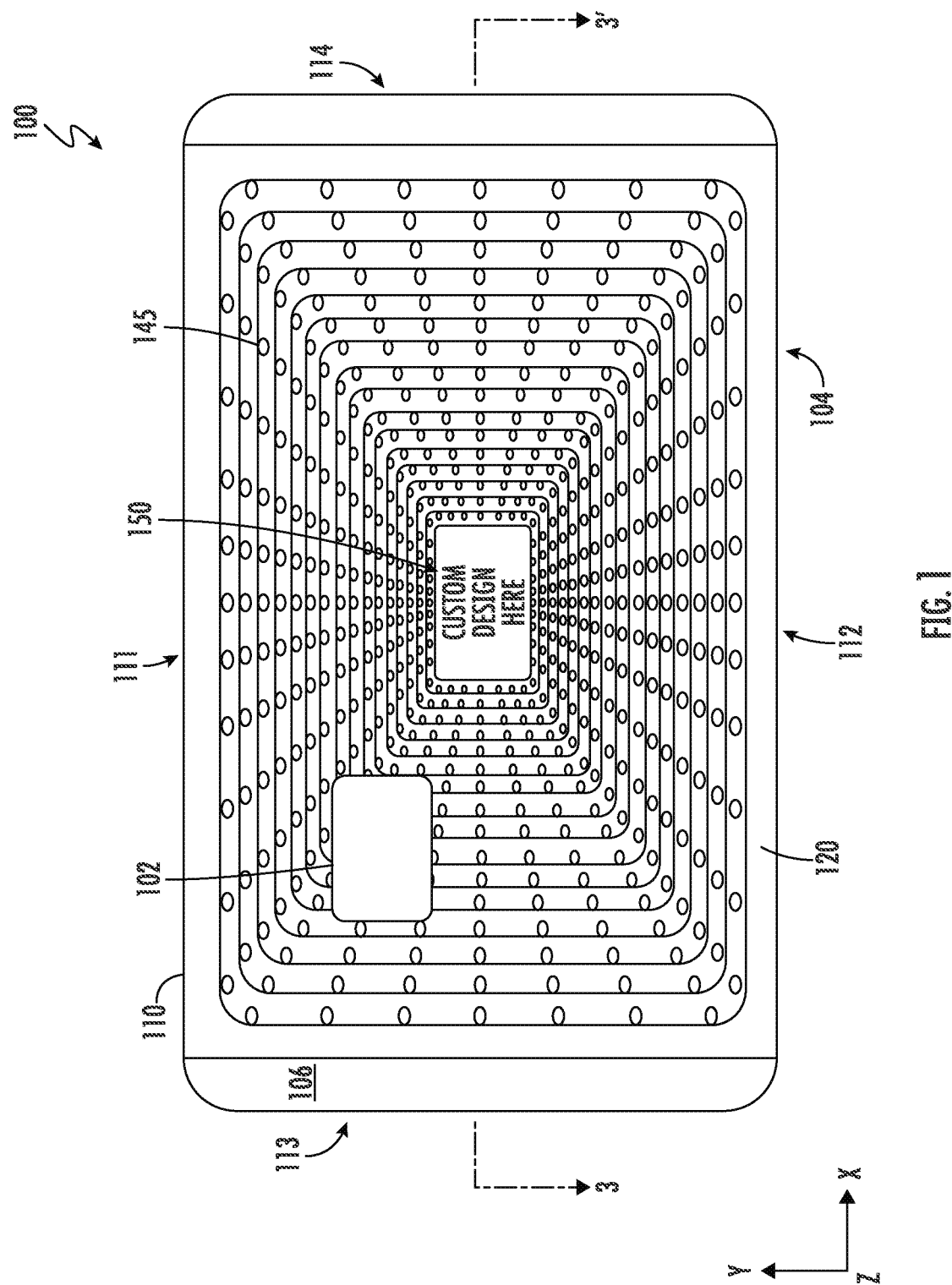
FIG. 1 is a top view of a transaction card in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Transaction cards of the present disclosure may include internal components that provide the visual effect of an infinity mirror along one or both sides. The infinity effect enables a person viewing the card to visually experience a plurality of peripheral light streams or paths which continually converge down a virtually endless path to define a stimulating visual image. In some embodiments, the light source may be a phosphorescent or photoluminescence paint/ink extending around a perimeter of the card.

Figure 2:
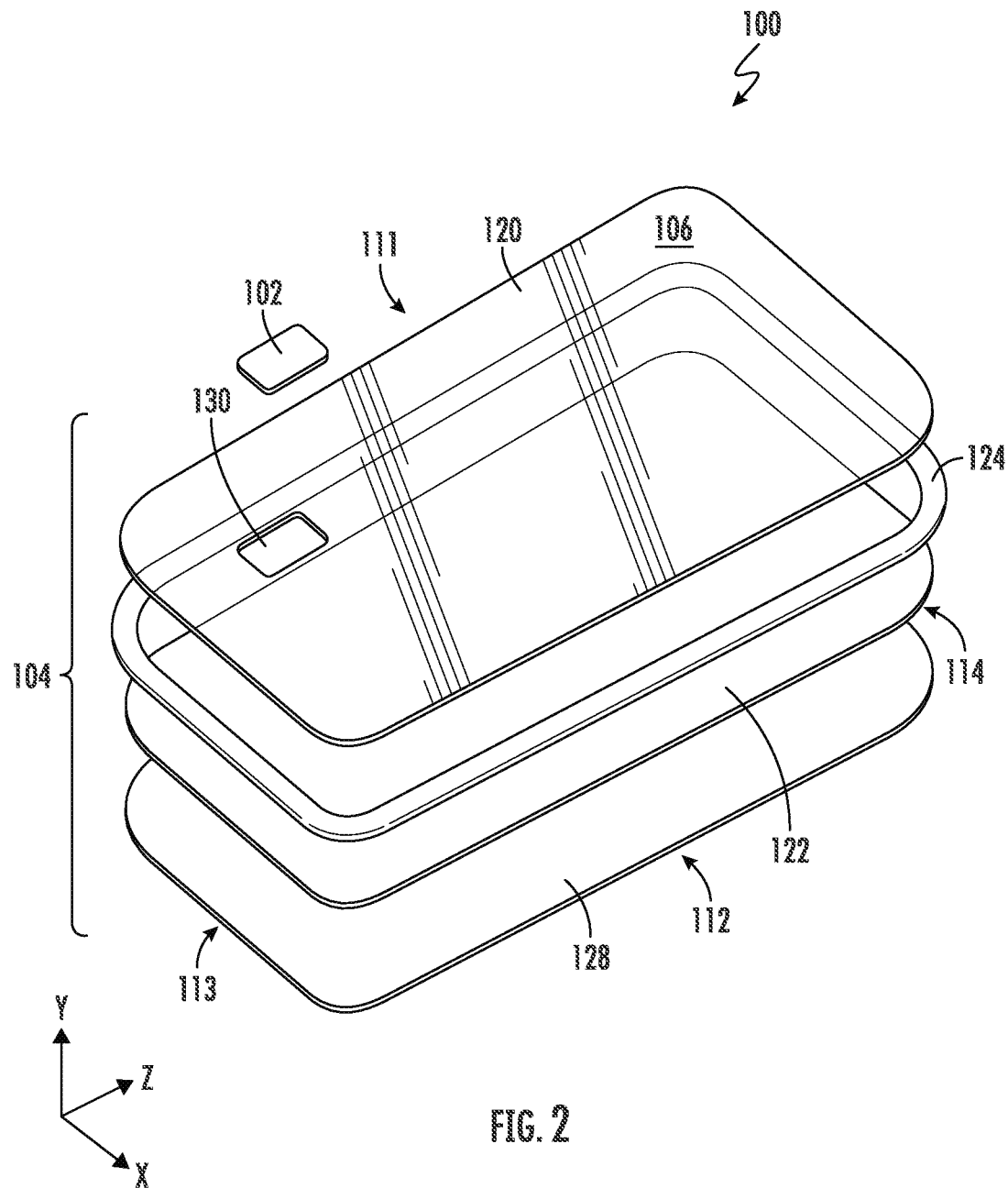
FIG. 2 is an exploded perspective view of the transaction card in accordance with embodiments of the present disclosure.
Figure 3:
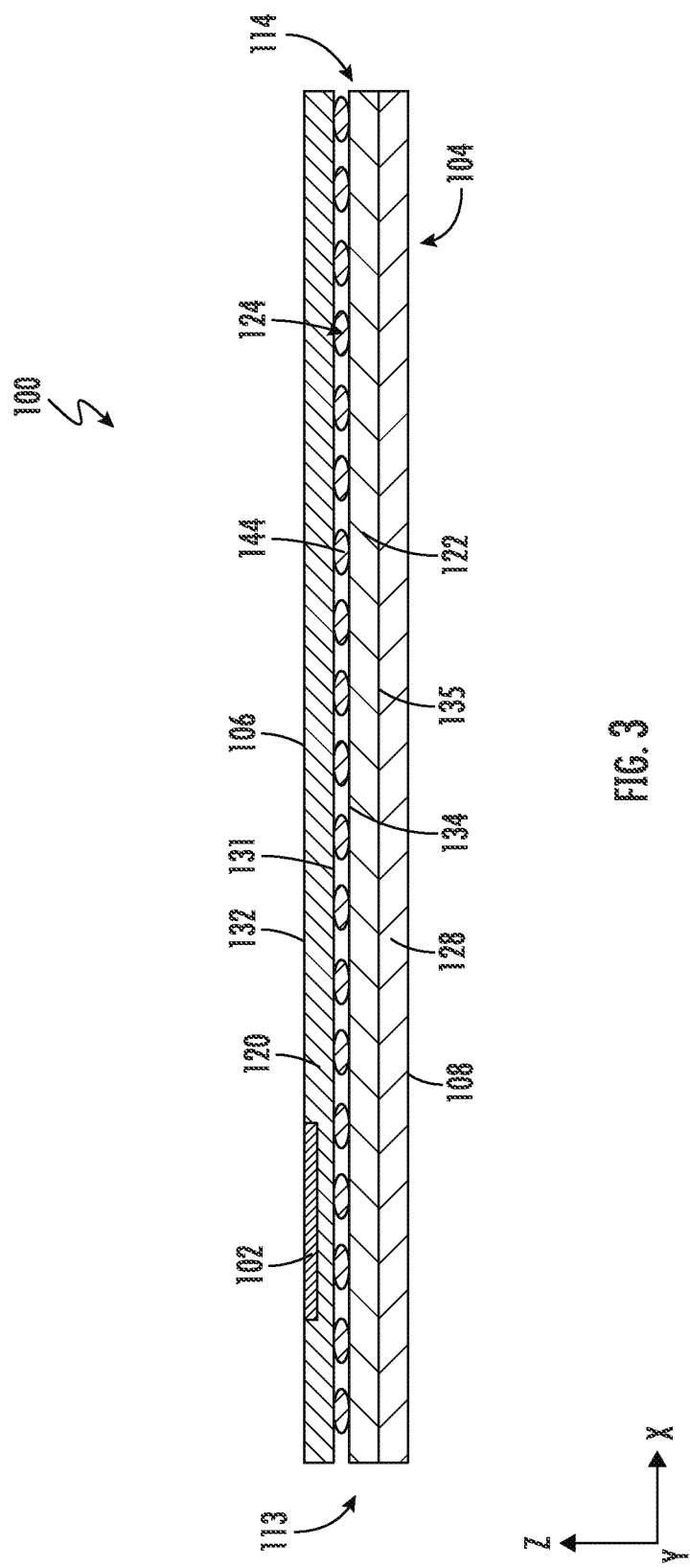
FIG. 3 is a cross-sectional view, along cutline 3-3' of FIG. 1, of the transaction card in accordance with embodiments of the present disclosure.

Referring now to FIGS. 1-3, an example transaction card (hereinafter "card") 100 according to embodiments of the disclosure will be described. Transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification chip 102, such as an EMV chip, the card 100 may also provide one or more functions requiring contact. For example, the card 100 may include a magnetic stripe (not shown) and/or a microchip connected to contacts present on an outer (e.g., back) layer of the card 100.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates held together by an adhesive, one or more layers may be formed of a different material. As will be described in further detail herein, the body 104 may include a first reflective layer 120 and a second reflective layer 122, wherein a light source 124 between the first reflective layer 120 and the second reflective layer 122 creates the visual effect of an infinity mirror.

As shown, the body 104 of the card 100 may include a first main side 106 opposite a second main side 108. Although non-limiting, the first main side 106 may correspond to a front or top side of the first reflective layer 120, while the second main side 108 may correspond to a back or bottom side of a backing layer 128. The body 104 may be defined by an outer perimeter 110 including a first side perimeter 111 opposite a second side perimeter 112, and a first end perimeter 113 opposite a second end perimeter 114.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may also include identifying indicia, such as an account holder name and/or a card number. Although non-limiting, the card number may be a 16-digit number (e.g., four groups of four digits). In other embodiments, the card number may include a different number of digits. The identifying indicia may be printed over/on an outer layer, such as the backing layer 128, of the body 104. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. More specifically, the identification chip 102 may be positioned within an opening 130 of the first reflective layer 120. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

In some embodiments, the first reflective layer 120 may be a two-way glass mirror, while the second reflective layer 122 may be a one-way glass mirror. As best shown in FIG. 3, the first reflective layer 120 has a first inner surface 131 opposite a first outer surface 132, while the second reflective layer 122 has second inner surface 134 opposite a second outer surface 135. The second outer surface 135 may be directly secured to the backing layer 128. Generally, the first reflective layer 120 is a light-transmissible and reflective, while the second reflective layer 122 is merely reflective. The light source 124 may be arranged between the first and second reflective layers 120, 122. When the light source 124 emits a light output (e.g., beams), the light beams are repeatedly reflected and transmitted between the first inner surface 131 and the second inner surface 134. Consequently, when viewing from the first main side 106 of the card 100, the light beams from the light source 124 appear to recede into infinity, creating the appearance of a mirror image effect.

Although non-limiting, the transparency/reflectivity ratio of the first reflective layer 120 may be in the range between 40/60 and 90/10. For example, when the transparency/reflectivity ratio of the first reflective layer 120 is 40/60, 40 percent of the light beams from the second reflective layer 122 are transmitted through the first reflective layer 120, and 60 percent of the light beams are reflected back to the second reflective layer 122 by the first reflective layer 120. It will be appreciated that the transparency/reflectivity ratio of the first reflective layer 120 may be varied as desired. The backing layer 128 may be substantially opaque.

The light source 124 of the card 100 may be a series of light emitting diodes and/or a variety of different luminous materials. For example, the light source 124 may be a phosphorescent or photoluminescent material extending around the perimeter 110 of the body 104 of the card 100. Phosphorescent and photoluminescent materials have a sustained glow which lasts after exposure to light, typically fading over time. As such, no power source may be required within the body 104 of the card 100 for generating the light output. Phosphorescent material may include paint/ink made from phosphors such as silver-activated zinc sulfide or doped strontium aluminate. Photoluminescence material may include paint/ink made from a phosphor, such as zinc sulfide or an aluminate compound. It will be appreciated that other luminous materials may be similarly employed.

The light source 124 may be applied directly to the first inner surface 131 of the first layer 120 and/or the second inner surface 134 of the second layer 122. In other embodiments, the light source 124 may be formed on a separate layer (not shown), which is sandwiched between the first and second layers 120, 122. It will be appreciated that the light source 124 may take on virtually any shape or configuration. For example, as shown in FIG. 2, the light source 124 may be a flat, substantially rectangular band with an approximately uniform thickness in the x-z plane. As shown in FIG. 3, the light source 124 may include a plurality of discreet elements or pixels 144 arranged in a desired pattern. When reflected, the pixels 144 may appear as a series of receding dashes or dots 145 moving towards a center of the body 104 with decreasing intensity, e.g., as shown in FIG. 1. Although shown as generally extending around the perimeter 110 of the card 100, the light source 124 may extend across the first main side 106, e.g., between the first and second end perimeters 113, 114 and/or between the first and second side perimeters 111, 112. Furthermore, the light source 124 may include a variety of different colors, as desired.

In some embodiments, as shown in FIG. 1, the card 100 may further include a logo or other graphic 150 visible from the first main side 106 of the body 104. The graphic 150 may be formed along the first inner surface 131 and/or the first outer surface 132 of the first layer 120, or along the second inner surface 134 of the second layer 122. In some embodiments, the graphic 150 may be made from phosphorescent or photoluminescent material. As a result, when the graphic 150 is provided along the first inner surface 131 and/or the second inner surface 134, light beams from the graphic 150 will also appear to recede into infinity, creating the appearance of a mirror image effect for the graphic 150. The graphic 150 may be a same or different color than the light source 124. Furthermore, the graphic 150 may have a same or different output intensity from the light source 124.

Although described herein as having an infinity mirror along the first main side 106 of the card 100, it will be appreciated that a second infinity mirror may additionally, or alternatively, be provided along the second main side 108 of the card 100. For example, a third reflective layer may be attached to an outer surface of the backing layer 128, and a second light source may be provided between the third reflective layer and a fourth reflective layer. The fourth reflective layer may be a two-way glass mirror, while the third reflective layer may be a one-way glass mirror. In some embodiments, a magnetic stripe may be provided along or within the fourth reflective layer.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body comprising a first reflective layer and a second reflective layer, wherein the first reflective layer is a two-way mirror, a reflective surface of the two-way mirror facing the second reflective layer, wherein the second reflective layer is a one-way mirror; and
a light source between the first reflective layer and the second reflective layer.

2. The transaction card of claim 1, further comprising a backing layer connected to the second reflective layer.

3. The transaction card of claim 1, wherein the first reflective layer has a first inner surface opposite a first outer surface, wherein the second reflective layer has second inner surface opposite a second outer surface, and wherein a light output from the light source is reflected between the first inner surface and the second inner surface.

4. The transaction card of claim 1, wherein the light source comprises a plurality of light emitting diodes.

5. The transaction card of claim 1, wherein the light source comprises a luminescent material.

6. The transaction card of claim 5, wherein the luminescent material is a luminescent paint.

7. The transaction card of claim 1, wherein the light source extends around a perimeter of the body.

8. The transaction card of claim 1, wherein an identification chip is coupled to the first reflective layer.

9. The transaction card of claim 8, wherein the identification chip is an EMV chip.

10. A transaction card, comprising:
a body comprising a first reflective layer and a second reflective layer, wherein the first reflective layer is a two-way mirror, a reflective surface of the two-way mirror facing the second reflective layer, wherein the second reflective layer is a one-way mirror; and a light source between the first reflective layer and the second reflective layer, wherein the light source extends around a perimeter of the body.

11. The transaction card of claim 10, further comprising a backing layer connected to the second reflective layer.

12. The transaction card of claim 10, wherein the first reflective layer has a first inner surface opposite a first outer surface, wherein the second reflective layer has second inner surface opposite a second outer surface, and wherein a light output from the light source is reflected between the first inner surface and the second inner surface.

13. The transaction card of claim 10, wherein the light source comprises at least one of a plurality of light emitting diodes or a luminescent material.

14. The transaction card of claim 10, wherein an identification chip is embedded within an opening in the first reflective layer.

15. A transaction card, comprising:
a body comprising a first reflective layer and a second reflective layer, wherein an identification chip is coupled to the first reflective layer, wherein the first reflective layer is a two-way mirror, a reflective surface of the two-way mirror facing the second reflective layer, wherein the second reflective layer is a one-way mirror; and
a light source between the first reflective layer and the second reflective layer, wherein the light source extends around a perimeter of the body.

16. The transaction card of claim 9, wherein the two-way mirror has a first inner surface opposite a first outer surface, wherein the one-way mirror has a second inner surface opposite a second outer surface, and wherein a light output from the light source is reflected between the first inner surface and the second inner surface.

17. The transaction card of claim 15, wherein the light source comprises at least one of a plurality of light emitting diodes or a luminescent material.

18. The transaction card of claim 17, wherein the luminescent material is a luminescent paint.

19. The transaction card of claim 15, wherein an identification chip is coupled to the first reflective layer.

20. The transaction card of claim 19, wherein the identification chip is an EMV chip.

* * * * *

UNITED STATES PATENT AND TRADEMARK OFFICE
CERTIFICATE OF CORRECTION

PATENT NO. : 12,253,660 B2
APPLICATION NO. : 17/470367
DATED : March 18, 2025
INVENTOR(S) : Tyler Maiman et al.

Page 1 of 1

It is certified that error appears in the above-identified patent and that said Letters Patent is hereby corrected as shown below:

In the Claims

At Claim 16, replace "transaction card of claim 9, wherein" with "transaction card of claim 15, wherein".

Signed and Sealed this
Eighth Day of July, 2025

Coke Morgan Stewart
*Acting Director of the United States Patent and Trademark Office*